US012784296B2

(12) United States Patent
Narain

(10) Patent No.: US 12,784,296 B2
(45) Date of Patent: Nov. 3, 2026

(54) METHOD AND SYSTEM FOR AUTOMATICALLY GENERATING EXPLAINER VIDEOS FROM TEXT-BASED DATA SOURCE

(71) Applicant: Profformance Technologies Private Limited, Gurugram (IN)

(72) Inventor: Sahil Narain, Gurgaon (IN)

(73) Assignee: Profformance Technologies Pvt. Ltd., Gurugram (IN)

( * ) Notice: Subject to any disclaimer, the term of this patent is extended or adjusted under 35 U.S.C. 154(b) by 0 days.

(21) Appl. No.: 19/460,168

(22) Filed: Jan. 26, 2026

(65) Prior Publication Data

US 2026/0228937 A1 Aug. 6, 2026

(30) Foreign Application Priority Data

Jan. 27, 2025 (IN) ............................ 202511006636

(51) Int. Cl.
*G06T 11/00* (2026.01)
*G06V 30/414* (2022.01)

(52) U.S. Cl.
CPC ............ *G06T 11/00* (2013.01); *G06V 30/414* (2022.01)

(58) Field of Classification Search
CPC .............................. G06T 11/00; G06V 30/414
See application file for complete search history.

(56) References Cited

U.S. PATENT DOCUMENTS

2003/0133623 A1 * 7/2003 Lee ........................ H04N 1/403 382/270
2010/0174985 A1 * 7/2010 Levy ..................... G06F 40/163 715/244
2019/0155910 A1 * 5/2019 Dockhorn ............... G06F 40/30
2025/0036861 A1 * 1/2025 Goshen ................. G06F 16/345

FOREIGN PATENT DOCUMENTS

IN 201921006144 A * 2/2019
JP 2008234639 A * 10/2008

OTHER PUBLICATIONS

Nagao et al. machine translation of JP-2008234639-A (Year: 2008).*

* cited by examiner

*Primary Examiner* — Kee M Tung
*Assistant Examiner* — Xiaoming Wei
(74) *Attorney, Agent, or Firm* — RC Trademark Company

(57) ABSTRACT

The method automates the creation of explainer videos from text-based data by using a processor to analyse and identify components of an input document, such as text and images. The processor determines the reading order based on visual analysis and extracts structured information, including text-based and image-based elements. The text-based elements include paragraphs, lines, tables, complex formulas and the like. The image-based elements include schematics, graphs, illustrations and the like. The processor identifies the optimal amount of content displayable per screen, and the associated timing selects a suitable layout from predefined layouts. It generates an explainer video for at least one topic in the input document, ensuring a coherent and visually organised presentation.

7 Claims, 5 Drawing Sheets

METHOD AND SYSTEM FOR AUTOMATICALLY GENERATING EXPLAINER VIDEOS FROM TEXT-BASED DATA SOURCE

TECHNICAL FIELD

The present disclosure relates to automated video creation methods. Moreover, the present disclosure relates to a method and a system for automatically generating explainer videos from text-based data sources.

BACKGROUND

In the domain of content creation, an explainer video is a useful tool for conveying technical information, educational content, and product demonstrations in a user-friendly and engaging manner. However, the methods of creating such explainer videos involve multiple manual steps, including reading and extracting information from a technical document. However, the creation of explainer videos from technical documents presents significant challenges, particularly in preserving the precise technical meaning and accuracy of source material. The primary challenge lies in accurately interpreting and translating complex technical information into video format while ensuring that the original meaning remains intact throughout the transformation process.

Conventionally, an explainer video generation system may not provide accurate text extraction for complex layouts of the technical documents. The explainer video generation system fails to simulate the human ability to read and comprehend such complex layouts seamlessly. The inability to seamlessly read and comprehend such complex layouts increases the time required for the preparation of content for explainer videos. The inability to seamlessly read and comprehend such complex layouts introduces a possibility of errors in content interpretation, making the process of generation of the explainer videos unsuitable for scalable or multilingual video creation.

Therefore, in light of the foregoing discussion, there exists a need to overcome the aforementioned drawbacks.

SUMMARY

The present disclosure provides a method and a system for automatically generating explainer videos from a text-based data source. The present disclosure seeks to provide a solution to the existing technical problem of how to generate explainer videos by seamlessly reading and comprehending complex layouts of a provided disclosure with accuracy and with minimal manual intervention. The present disclosure aims to provide a solution that overcomes, at least partially, the problems encountered in the prior art and provides an improved method and an improved system for automatically generating the explainer videos from a text-based data source, featuring an automated video generation method for generating the explainer videos.

One or more objectives of the present disclosure is achieved by the solutions provided in the enclosed independent claims. Advantageous implementations of the present disclosure are further defined in the dependent claims.

In one aspect, the present disclosure provides a method for automatically generating explainer videos from a text-based data source, the method comprising:

identifying, by a processor, a plurality of different components of an input document based on a visual analysis of the input document;

determine, by the processor, a reading order of information present in the input document based on the identification of the plurality of different components and the visual analysis of the input document;

executing, by the processor, a structured information extraction comprising extraction of a text-based component and an image-based component based on the identification of the reading order and the identification of the plurality of different components;

identifying, by the processor, an amount of information displayable per screen on a display screen and a time parameter associated with the amount of information displayable per screen, based on content extracted through the structured information extraction;

selecting, by the processor, a first layout from a set of predefined layouts based on the amount of the information identified to be displayable per screen and the time parameter; and generating, by the processor, an explainer video for at least one topic in the input document based on the selected first layout, the amount of information displayable per screen, and the time parameter.

Visual analysis based component identification eliminates the requirement of manual document pre-processing or tagging by automatically detecting different elements within input documents. The capability of the system to determine reading order through visual analysis overcomes limitations of conventional systems that require explicit document markup or metadata, thereby reducing complexity in document preparation processes. The structured information extraction mechanism enables unified processing of both textual and image-based components in a single pipeline, removing the inefficiencies of separate processing streams for different content types. The extraction process integrates seamlessly with the automatic determination of displayable information quantity and associated time parameters, which removes subjective decision making in content segmentation that typically requires manual intervention. The automated selection of layouts from predefined templates based on identified display parameters ensures standardised video output while eliminating the need for manual layout decisions per content segment. The template-driven approach, coupled with automatic parameter identification enables seamless end-to-end video generation that maintains content coherence and timing synchronisation without manual oversight, thereby streamlining the entire video creation process.

In another aspect, the present disclosure provides a system for automatically generating explainer videos from a text-based data source, the system comprising:

a processor configured to:

identify a plurality of different components of an input document based on a visual analysis of the input document;

determine a reading order of information present in the input document based on the identification of the plurality of different components and the visual analysis of the input document;

execute a structured information extraction comprising extraction of a text-based component and an image-based component based on the identification of the reading order and the identification of the plurality of different components;

identify an amount of information displayable per screen on a display screen and a time parameter associated with the amount of information displayable per screen based on content extracted through the structured information extraction;

select a first layout from a set of predefined layouts based on the amount of the information identified to be displayable per screen and the time parameter; and generate an explainer video for at least one topic in the input document based on the selected first layout, the amount of information displayable per screen, and the time parameter.

The system achieves all the advantages and technical effects of the method of the present disclosure.

It has to be noted that all devices, elements, circuitry, units and means described in the present application could be implemented in the software or hardware elements or any kind of combination thereof. All steps which are performed by the various entities described in the present application, as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognise that other embodiments for carrying out or practicing the present disclosure are also possible.

Figure 1:
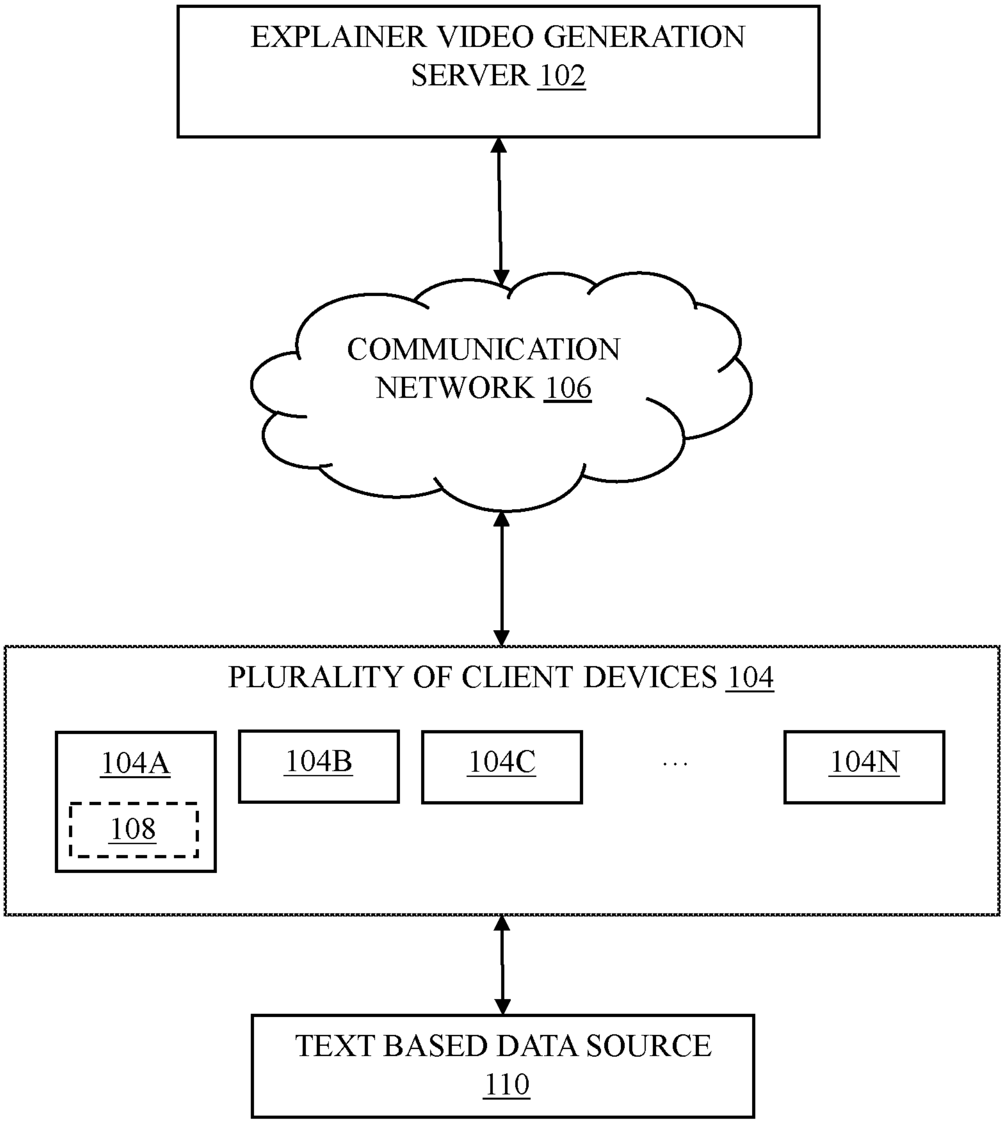
FIG. 1 is a block diagram of a system for automatically generating explainer videos from a text-based data source, in accordance with an embodiment of the present disclosure.

FIG. 1 is a block diagram of a system for automatically generating explainer videos from a text-based data source, in accordance with an embodiment of the present disclosure. With reference to FIG. 1, there is shown a block diagram of a system 100. The system 100 includes an explainer video generation server 102, a plurality of client devices 104, a communication network 106, and a text-based data source 110. The plurality of client devices 104 includes a first client device 104A, a second client device 104B, a third client device 104C up to an Nth client device 104N. As illustrated in the embodiment of FIG. 1, the first client device 104A includes a user interface 108 rendered on the first client device 104A. Similarly, in some other embodiments, each of the plurality of client devices 104 may include a corresponding user interface similar to the user interface 108 of the client device 104A.

The present disclosure provides the system 100 for automatically generating the explainer videos from structured information extracted from the text-based data source 110. The system 100 extracts content from the text-based data source 110, such as technical manuals or product documentation. The extracted content is then processed to summarise key information, collate graphics, and automatically select layouts suitable for the content. The system 100 generates audio tracks for the video, translates them into multiple languages, and creates corresponding subtitles for multilingual accessibility. A resulting explainer video comprises multi-channel audio and subtitle streams, ensuring scalability and accessibility for global audiences. The automation in the generation of the explainer video reduces manual intervention and enhances the efficiency of creating informative and engaging explainer videos.

The explainer video generation server 102 includes suitable logic, circuitry, interfaces, and code that may be configured to communicate with the plurality of client devices 104 via the communication network 106. In an implementation, the explainer video generation server 102 may be a master server or a master machine that is a part of a data center that controls an array of other cloud servers communicatively coupled to it for load balancing, running customised applications, and efficient data management. Examples of the explainer video generation server 102 may include, but are not limited to, a cloud server, an application server, a data server, or an electronic data processing device.

Each of the plurality of client devices 104 refers to an electronic computing device associated with a client. The plurality of client devices 104 may be configured to transmit input documents to the explainer video generation server 102 through the user interface 108, enabling the initiation of an automated video generation process. The explainer video generation server 102 may then be configured to retrieve a text-based data source that represents one or more input documents. Examples of the plurality of client devices 104 may include but are not limited to a mobile device, a smartphone, a desktop computer, a laptop computer, a Chromebook, a tablet computer, a robotic device, or other user devices.

The communication network 106 includes a medium (e.g., a communication channel) through which the plurality of client devices 104 communicates with the explainer video generation server 102. The communication network 106 may be wired or wireless. Examples of the communication network 106 may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

Figure 2:
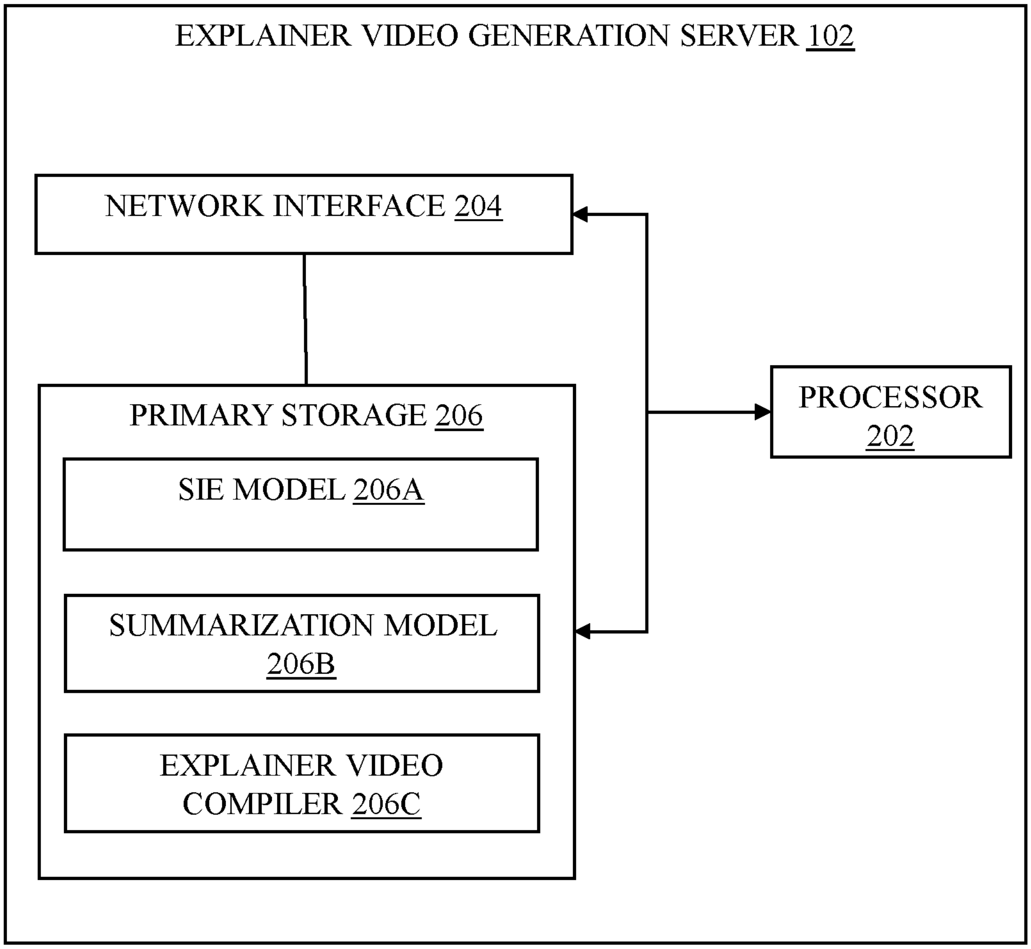
FIG. 2 is a block diagram of an explainer video generation server, in accordance with an embodiment of the present disclosure.

FIG. 2 is a block diagram of the explainer video generation server, in accordance with an embodiment of the present disclosure. FIG. 2 is described in conjunction with elements from FIG. 1. With reference to FIG. 2, there is shown a block diagram 200. The block diagram 200 includes the explainer video generation server 102. The explainer video generation server 102 includes a processor 202, a network interface 204, and a primary storage 206. The primary storage 206 includes a structured information extraction (SIE) model 206A, a summarisation model 206B, and an explainer video compiler 206C.

The processor 202 refers to a computational element that is operable to respond to and process instructions that drive the system 100. The processor 202 may refer to one or more individual processors, processing devices, and various elements associated with a processing device that may be shared by other processing devices. Additionally, the one or more individual processors, processing devices, and elements are arranged in various architectures for responding to and processing the instructions that drive the system 100. In some implementations, the processor 202 may be an independent unit and may be located outside the explainer video generation server 102 of the system 100. Examples of the processor 202 may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The network interface 204 refers to a communication interface to enable communication of the server 102 to any other external device, such as the plurality of client device 104. Examples of the network interface 204 include, but are not limited to, a network interface card, a transceiver, and the like.

The primary storage 206 refers to a volatile or persistent medium, such as an electrical circuit, magnetic disk, virtual memory, or optical disk, in which a computer can store data or software for any duration. Optionally, the primary storage 206 is a non-volatile mass storage, such as a physical storage media. Furthermore, a single memory may encompass and, in a scenario, and the system 100 is distributed, the processor 202, the primary storage 206 and/or storage capability may be distributed as well. Examples of implementation of the primary storage 206 may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The SIE model 206A visually analyses the layout of the input document and then identifies the different components of the input document. The SIE model 206A then identifies the columns of text on a given page of the input document. The SIE model 206A is trained by looking at multiple documents, which have tags for the number of columns and a reading order. The reading order here means the order in which a human would naturally read the input document. For example, there are certain documents (for example, brochures and magazines) that have two-columns with the reading order from top to bottom for each column, and there are some documents (for example, magazines) that have three-columns of text with the reading order from top to bottom for each column. Some documents (for example, newspapers) can have a complex layout with multiple columns of text arranged in a complex orientation without any specific reading order. The SIE model 206A is trained to mimic human cognitive abilities. The SIE model 206A identifies the overall structure of the information present on the given page of the input document. The SIE model 206A collects and combines a part of the same topic and then determines the reading order.

In operations, the processor 202 is configured to identify a plurality of different components of the input document based on a visual analysis of the input document. In an implementation, the different components of the input document comprise page headings, sub-headings, text columns, images, captions, tables, or other predefined components. The identification of different components is achieved through machine learning operations that analyse visual characteristics like font properties, spacing patterns, and structural relationships. By categorising such different components of the input document, the system 100 may maintain proper document hierarchy and ensure appropriate emphasis in the resulting explainer video.

The processor 202 is further configured to determine the reading order of information present in the input document based on the identification of the plurality of different components and the visual analysis of the input document. The processor 202 of the system 100 is configured to analyse a spatial relationship and visual layout of the identified components of the input document to determine the reading order. For example, in a scientific paper, the processor 202 examines the positioning of columns, headings, and figures to establish that an abstract should be read before the introduction, followed by methodology sections. Such determination of the reading order ensures that information is presented in a logical sequence that maintains an intended narrative flow.

In an implementation, the processor 202 is configured to detect a change in a number of columns of text from a first page of the input document to a second page. The processor 202 is configured to update the reading order per page of the input document when the change in the number of columns of text is detected. The system 100 incorporates dynamic column detection capabilities to identify changes in text column layout between consecutive pages of the input document. In another implementation, the system 100 uses pattern recognition to detect transitions from single to multiple columns or vice versa. When such changes are detected, the reading order is automatically recalculated per page to maintain the intended narrative flow. The dynamic column detection ensures that content is presented in the correct sequence regardless of varying page layouts.

The processor 202 is further configured to execute a structured information extraction comprising extraction of a text-based component and an image-based component based on the identification of the reading order and the identification of the plurality of different components. The processor 202 executes structured information extraction by separating and categorising text-based components and image-based components based on the identified reading order. For example, when processing a textbook page, the system 100 extracts the main text, sidebars, and images while maintaining the contextual relationship between the main text, sidebars, and images. The structured information extraction uses optical character recognition (OCR) for extraction of the text-based component and the image-based component. An extracted text and image are collected into a computer-readable format (for example, JSON, or a No-SQL database). In an implementation, the extracted text is extracted from a paragraph, tables, complex formulas, and the like from the input document. In such implementations, the extracted image is extracted from illustrations, graphs, schematics and the like from the input document. The structured information extraction approach preserves the contextual relationships between distinct types of content and enables the proper organisation of the content. The extracted structured information forms the foundation for creating a well-organised explainer video.

In an implementation, the system 100 is configured to detect whether a quality parameter of the image-based component extracted in a given page of the input document is less than a quality threshold. During image extraction, the system 100 implements quality control for images by comparing extracted image quality against predetermined thresholds. The quality of the extracted image is ensured in two ways. If the image is extractable (as in the case of common file formats like PDFs), then the highest possible resolution image is extracted. In another implementation, the system 100 is configured to automatically open the input document on a virtual device to take a screenshot of a relevant section comprising the image-based component when the image-based component is not extractable programmatically or when the quality parameter of the image-based component is less than the quality threshold. If the image is not extractable programmatically, then a virtual device opens the document and takes a high-resolution screenshot of the relevant section based on the coordinates identified by the SIE model 206A. These two ways ensure that the images extracted are of the highest possible quality.

In an implementation, the pre-trained structured information extraction (SIE) model 206A is executed for the structured information extraction in which different types of information, including the text-based component and the image-based component, are collated per topic present in the input document. The SIE model 206A uses deep learning techniques to identify and categorise distinct types of information in the input document, collating both text and image components by topic. The organised structured information extraction ensures that related content stays together, maintaining a topical coherence in the resulting explainer video.

In an implementation, the summarisation model 206B is executed on the content extracted through the structured information extraction to generate summarised content. The amount of information displayable per screen on the display screen is identified using the summarised content. The summarisation model is used for summarising the extracted text. The summarisation model 206B is used to condense extracted content while preserving key information. A summarised content is then used to determine a screen content load. The ideal screen content load refers to the amount of information displayed on a screen at one time. The summarised content from the summarisation model 206B ensures that each screen contains digestible amounts of information without overwhelming viewers.

The processor 202 is further configured to identify an amount of information displayable per screen on a display screen and a time parameter associated with the amount of information displayable per screen, based on content extracted through the structured information extraction. The processor 202 of the system 100 calculates the screen content load per screen by analysing the complexity and volume of the extracted content. For instance, when dealing with technical content, the processor 202 might determine that each screen should contain no more than three key points and one supporting image, with a display time of 20 seconds. The calculation of the time parameter and amount of information to be displayed per screen is performed by considering factors like reading speed, content complexity, and cognitive load principles. The cognitive load principles ensure that the amount of information presented matches the mental capacity of the viewers, allowing them to process, comprehend, and retain the information effectively without feeling overwhelmed. The resulting explainer video presents information in digestible chunks that enhance the learning and engagement of the viewers.

The processor 202 is further configured to select a first layout from a set of predefined layouts based on the amount of the information identified to be displayable per screen and the time parameter. The processor 202 selects appropriate layouts from predefined templates based on the calculated screen content load and timing parameters. For example, if a screen contains a definition and an illustrative image, the system 100 might choose a split-screen layout with the definition on one side and the image on the other side of the screen. In another example, a paragraph containing 15 sentences is too large for a single screen, so the paragraph can be broken into maybe 3 or 4 screens, with only 3-4 sentences on each screen, depending on the length of the sentences and the accompanying images, tables etc. according to the relevant context. A layout selection operation matches content requirements with pre-defined layouts using rule-based decision making. The layout selection operation ensures that the content is presented in the most effective visual format. The selected first layout provides information clarity and maintains viewer engagement throughout the explainer video. The layout selection operation operates by evaluating multiple content attributes and matching them with appropriate template features. The layout selection operation first analyses the characteristics of the extracted content, such as text length (short/medium/long), presence of images (single/multiple), content type (definition/process/comparison), information hierarchy (main points vs supporting details), and the contextual relationship between different elements of the input document. For example, in case the content contains a main concept with three supporting examples and an illustrative image. In such cases, the layout selection operation compares the content attributes against predefined content patterns and the corresponding templates. The layout selection operation also considers the calculated screen time requirements and screen content load to ensure the selected layout can accommodate the content effectively. For instance, if a screen requires 30 seconds of viewing time for complex technical content, the layout selection operation will prioritise layouts from the set of pre-defined layouts that support proper content distribution for longer viewing durations.

In another implementation, a plurality of speech segments per screen is generated based on the identification of the amount of information displayable per screen on the display screen and the time parameter. The system 100 is configured to generate multiple speech segments for each screen based on the calculated screen content load and time parameter. Using natural language processing, the content is divided into logical speaking units that align with visual elements. The visual elements are components of the screen that can be seen, such as images, graphs, charts, icons, text blocks, headings, and bullet points. The synchronisation of logical speaking units with the visual elements ensures proper pacing and allows viewers to process both visual and auditory information effectively.

In another implementation, subtitles in one or more languages are generated for the plurality of speech segments by identifying the plurality of speech segments per screen and the time parameter corresponding to timestamps associated with the plurality of speech segments. The system 100 is configured to create multilingual subtitles by analysing the plurality of speech segments and the corresponding timestamps. Using natural language processing, the system 100 is configured to generate accurately timed subtitles to match with the corresponding speech segment of the plurality of speech segments. The accurately timed subtitles make the content accessible to diverse audiences and enhance comprehension across language barriers.

The processor 202 is configured to generate an explainer video for at least one topic in the input document based on the selected first layout, the amount of information displayable per screen, and the time parameter. In yet another implementation, the generation of the explainer video for at least one topic in the input document comprises merging the plurality of speech segments as multi-channel audio and the subtitles in one or more languages into the explainer video. The system 100 is configured to generate the resulting explainer video by combining the selected layouts from the set of pre-defined layouts with the summarised content and time parameter. During the generation of the explainer video, the explainer video compiler 206C synchronises the visual elements, the plurality of speech segments into multi-channel audio and integrates multilingual subtitles into the resulting explainer video. Using audio-visual synchronisation techniques, all components are merged while providing sufficient time to each speech segment of the plurality of speech segments to execute before moving to a next screen. The integration of visual elements, the plurality of speech segments, and multilingual subtitles creates a cohesive multimedia experience that accommodates different learning preferences and language requirements. Such integration effectively communicates the content of the input document from the resulting explainer video. The resulting explainer video provides an engaging and effective means of conveying the information of the input document while maintaining the attention and comprehension of the viewers.

Figure 3A:
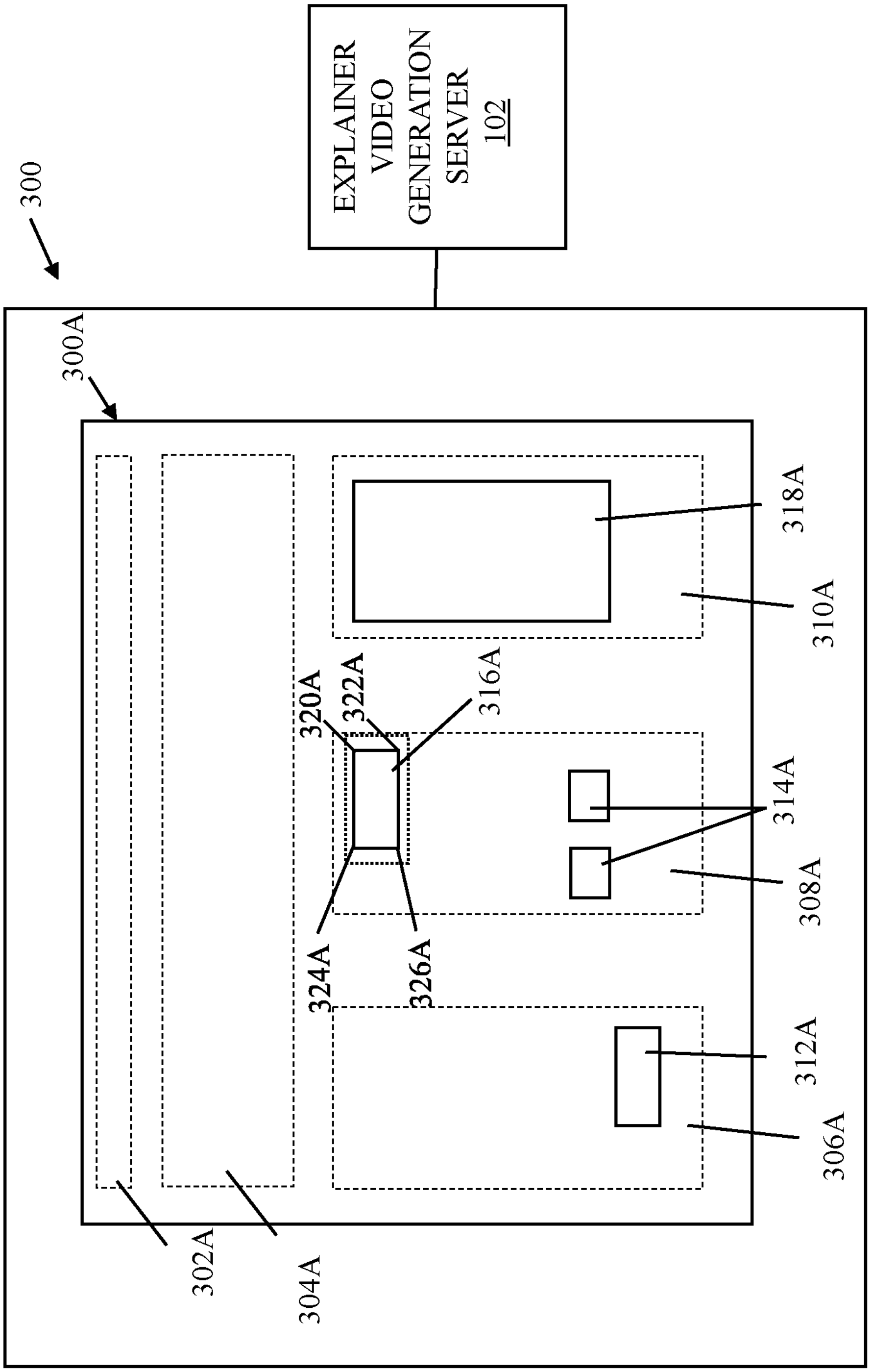
FIG. 3A is a diagram of a first page of an input document for explaining an exemplary scenario of the generation of an explainer video, in accordance with an embodiment of the present disclosure.
Figures 3B, 3C:
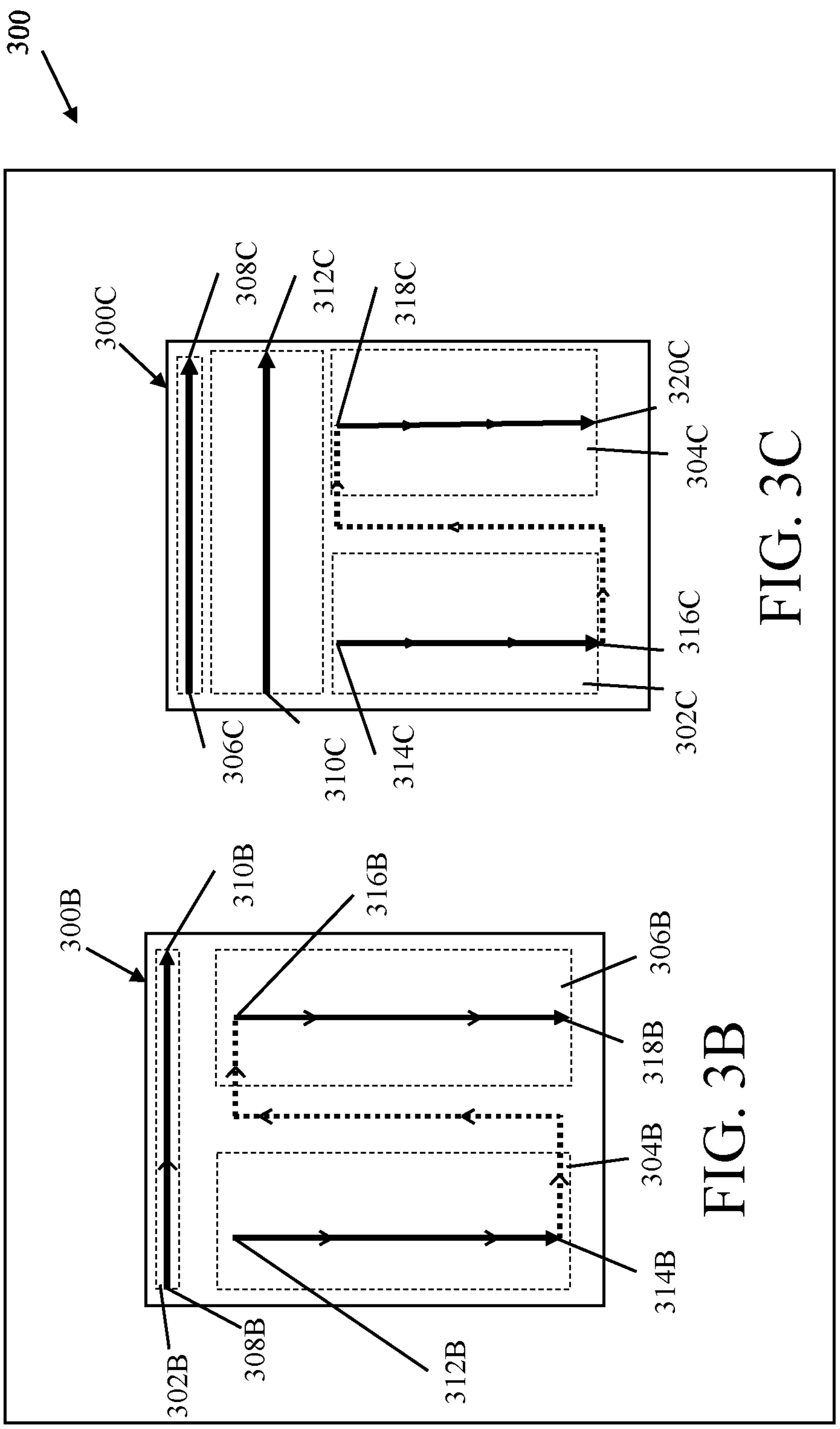
FIG. 3B is a diagram of a second page of the input document for explaining the exemplary scenario of generation of the explainer video, in accordance with an embodiment of the present disclosure.
FIG. 3C is a diagram of a third page of an input document for explaining the exemplary scenario of generation of the explainer video, in accordance with an embodiment of the present disclosure.

FIG. 3A is a diagram of a first page of an input document for explaining an exemplary scenario of the generation of an explainer video, in accordance with an embodiment of the present disclosure. FIG. 3B is a diagram of a second page of the input document for explaining the exemplary scenario of generation of the explainer video, in accordance with an embodiment of the present disclosure. FIG. 3C is a diagram of a third page of an input document for explaining the exemplary scenario of generation of the explainer video, in accordance with an embodiment of the present disclosure. FIGS. 3A, 3B and 3C are described in conjunction with elements from FIGS. 1 and 2.

With reference to FIG. 3A, there is shown an input document 300 with a first page 300A having different text orientation (for example, a two-column page, a three-column page, and the like) and different reading order. The input document 300 is communicatively coupled with the explainer video generation server 102. The first page 300A includes a plurality of text columns 302A, 304A, 306A, 308A, and 310A, and a plurality of graphics 312A, 314A, 316A, and 318A. The plurality of text columns 302A, 304A, 306A, 308A, and 310A contains headings, sub-headings, text related to the heading or sub-heading, and the plurality of graphics 312A, 314A, 316A, and 318A. The plurality of graphics 312A, 314A, 316A, and 318A may be an image, a graph, or a table associated with a certain heading, sub-heading or content from the first page 300A of the input document 300.

With reference to FIGS. 3B and 3C, there is shown a second page 300B and a third page 300C of the input document 300. The second page 300B of the input document 300 includes a plurality of text columns 302B, 304B, and 306B. The third page 300C of the input document 300 includes a plurality of text columns 302C and 304C.

In an exemplary scenario, when the input document 300 is provided to system 100, the system 100 performs a visual analysis on the input document 300. Specifically, the explainer video generation server 102 of the system 100 is configured to perform a visual analysis on the input document 300. The explainer video generation server 102 includes the SIE model 206A, which identifies the different text columns of the plurality of text columns 302B, 304B, and 306B. For example, the text column 302B is the heading and the text column 304B and the text column 306B is the text associated with the heading. The SIE model 206A identifies a reading order and starts reading the second page 300B. The reading order begins from text column 302B, which serves as the initial entry point. The SIE model 206A starts reading the second page 300B from a point 308B to a point 310B. After completing reading the text from text column 302B, the SIE model 206A then shifts the reading from text column 302B to text column 304B.

The SIE model 206A then follows the flow to point 312B, reading the text content in the text column 304B. Following the directional arrow, the SIE model 206A proceeds vertically to a point 314B. When the SIE model 206A finishes reading the text from the text column 304B, the SIE model 206A follows the dotted arrows to a point 316B, indicating a change in reading direction. The SIE model 206A transitions from the text column 304B to the text column 306B. The reading order begins from a point 316B and proceeds vertically to a point 318B, completing the logical sequence for the layout of the second page 300B.

Similarly, for the third page 300C, the system 100 identifies a modified layout where the reading begins at a point 306C and proceeds to a point 308C. The SIE model 206A transitions from the point 308C to a point 310C, indicating a change in reading direction. The SIE model 206A continues reading to a point 312C and then switches to the text column 302C, again indicating a change in reading direction. The SIE model 206A reads from a point 314C and proceeds vertically to a point 316C. The dotted line after the point 316C indicates a change in reading direction. The SIE model 206A transitions from the text column 302C to the text column 304C and begins reading the text from a point 318C to a point 320C.

Once the reading order is finalised, the information from the first page 300A, the second page 300B, and the third page 300C is extracted using structured information extraction (for example, dictionary or keyword-based extraction) or using the OCR. The structured information extraction is configured for both text extraction and image extraction. To ensure the quality of the extracted image, the system 100 has two ways. For instance, for the image extraction process on the first page 300A, the system 100 specifically focuses on graphic 316A. When attempting to extract the graphic 316A programmatically, the system 100 determines that the quality of the graphic 316A falls below a predetermined quality threshold. In response, the processor 202 initiates a virtual device screenshot mechanism. The system 100 identifies the precise coordinates of the graphic 316A bounded by points 320A, 322A, 324A, and 326A. The virtual device is automatically launched, and the input document 300 is opened to the exact page location. The system 100 then captures a high-resolution screenshot of the area defined by the points 320A, 322A, 324A, and 326A, ensuring optimal image quality for the resulting explainer video. The SIE model 206A processes the identified components, separating text and graphics received after the structured information extraction. For example, when processing the second page 300B, the SIE model 206A extracts the text flowing from the point 308B through 314B and associates the text with corresponding graphics.

The extracted text is processed by the summarisation model 206B, ensuring key concepts are preserved while maintaining digestible information chunks for the viewers. The system 100 then determines a layout from the set of pre-defined layouts to display the extracted content on the screen. For example, for the content of the second page 300B, the system 100 calculates that displaying three key points with their associated graphics will require 25 seconds of viewing time based on the complexity of the content. Based on the amount of text to display per screen, graphics associated with the text to display per screen and time parameter associated with the amount of information displayable per screen, the processor 202 selects an appropriate layout from the set of pre-defined layouts. The explainer video generation server 102 generates synchronised speech segments per screen, with the time stamps aligned with the time parameter associated with the amount of information displayable per screen. For example, the content flowing from 312B to 314B is converted into a speech segment with natural pauses to match the transition of the graphics associated with the text.

The system 100 then creates multilingual subtitles for each speech segment by identifying the time parameter corresponding to timestamps associated with each speech segment of the plurality of speech segments. Finally, all components (i.e. the summarised text, plurality of speech segments and subtitles) are merged by the explainer video compiler 206C to form an explainer video.

Figure 4:
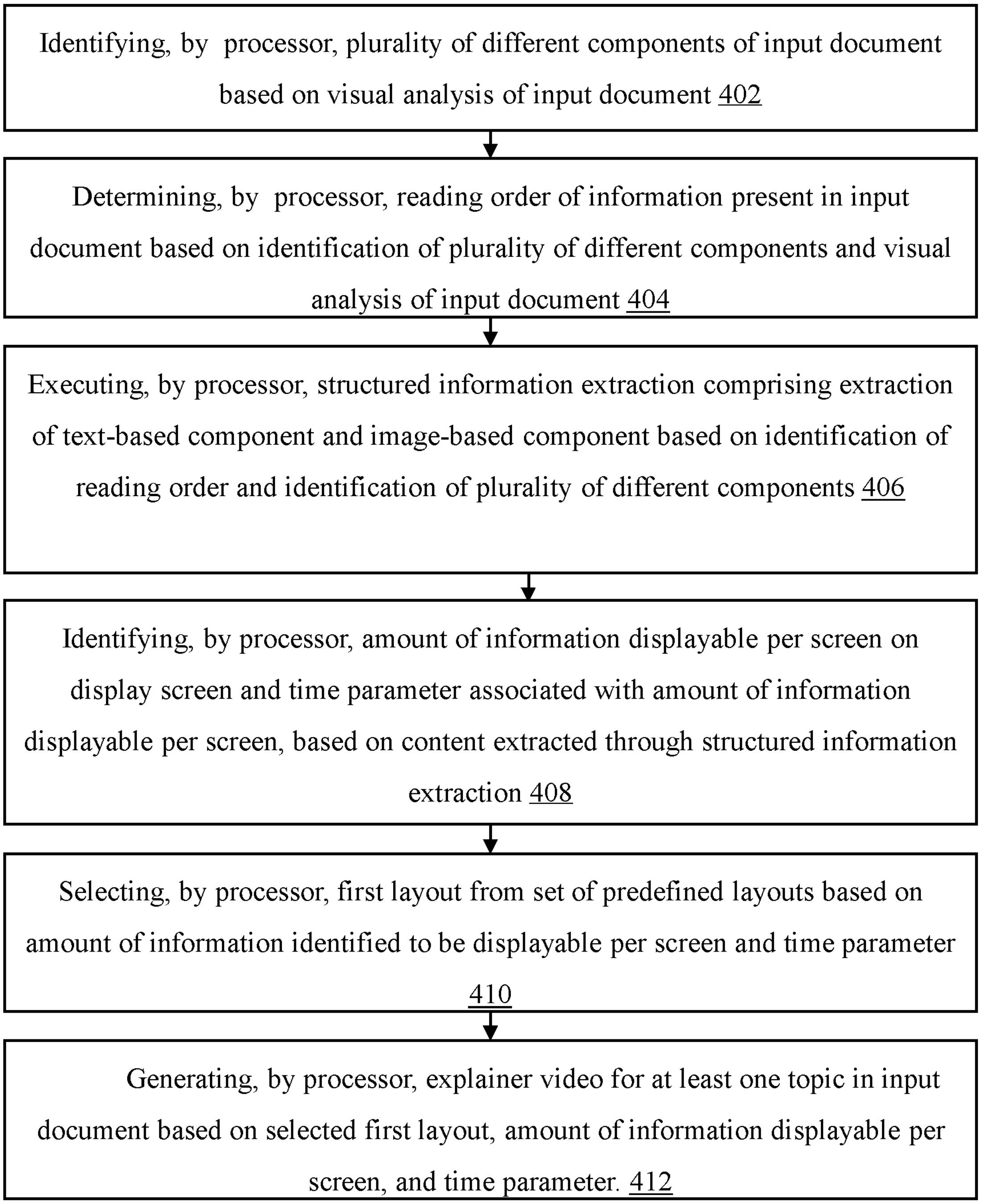
FIG. 4 is a flowchart of a method for automatically generating the explainer videos from text-based data source, in accordance with an embodiment of the present disclosure.

FIG. 4 is a flowchart of a method for automatically generating the explainer videos from text-based data source, in accordance with an embodiment of the present disclosure. FIG. 4 is explained in conjunction with elements from FIGS. 1, 2, 3A, 3B and 3C. With reference to FIG. 4, there is shown a flowchart of a method 400. The method 400 is executed at the explainer video generation server 102 (of FIG. 1). The method 400 may include steps 402 to 412.

At step 402, the method 400 includes identifying, by the processor 202, the plurality of different components of the input document based on the visual analysis of the input document. The processor 202 employs computer vision and pattern recognition techniques to analyse different components of the input document such as heading, sub-heading, images, text columns, tables, graphs and the like. The step 402 is the initial step to establish a structural hierarchy of the different components of the input document while preserving the spatial relationship between such different components.

At step 404, the method 400 includes determining, by the processor 202, the reading order of information present in the input document based on the identification of plurality of different components and visual analysis of the input document. The processor 202 analyses the spatial relationships between different components, directional indicators, and layout patterns to establish the reading order in the input document. In an implementation, the system 100 considers western reading patterns (left-to-right, top-to-bottom) alongside document-specific layout rules and visual markers. The system 100 can adapt to various document layouts and automatically determine the reading order. The automatic detection of reading order ensures information from the input document is processed and presented in a coherent sequence that maintains the intended narrative flow.

At step 406, the method 400 includes executing, by the processor 202, structured information extraction comprising extraction of text-based components and image-based components based on the identification of the reading order and identification of plurality of different components. The processor 202 utilises the reading order to extract and categorise several types of content systematically. The several types of content include tables, paragraphs, formulas, images, schematics, illustrations, graphs and the like. The structured information extraction approach employs OCR for text and specialised image processing operations for visual content. In an implementation, the system 100 can manage multiple types of content while preserving the contextual relationship of the content. Thereby resulting in well-organised content that maintains the original meaning and relationships in the resulting explainer video.

At step 408, the method 400 includes identifying, by the processor 202, the amount of information displayable per screen on the display screen and the time parameter associated with the amount of information displayable per screen, based on content extracted through structured information extraction. The processor 202 analyses content complexity, reading speed requirements, and screen content load to determine optimal information density and viewing duration for each screen. The system 100 ensures that information is presented in digestible chunks with appropriate viewing times.

At step 410, the method 400 includes selecting, by the processor 202, the first layout from the set of predefined layouts based on the amount of information identified to be displayable per screen and time parameter. The amount of information is extracted from multiple pages of the input document. The processor 202. The processor 202 employs rule-based decision making to match content requirements with the set of pre-defined layouts, considering factors like screen division patterns, element positioning rules, and space allocation ratios. The rule-based decision making enables the system 100 to automatically select the most effective presentation format for several types of content. Therefore, this results in a visually appealing and functionally effective explainer video.

At step 412, the method 400 includes generating, by the processor 202, the explainer video for at least one topic in the input document based on the selected first layout, the amount of information displayable per screen and the time parameter. The processor 202 combines text, graphics, transitions, and time parameter to create a cohesive explainer video, including synchronised speech segments and multilingual subtitles. The system 100 integrates multiple media elements into a single explainer video. Therefore, the explainer videos of professional quality can be produced to effectively communicate the content of the input document while maintaining the attention and comprehension of the viewers.

Visual analysis based component identification eliminates the requirement of manual document pre-processing or tagging by automatically detecting different elements within input documents. The capability of the method 400 to determine reading order through visual analysis overcomes limitations of conventional systems that require explicit document markup or metadata, thereby reducing complexity in document preparation processes. The structured information extraction mechanism enables unified processing of both textual and image-based components in a single pipeline, removing the inefficiencies of separate processing streams for different content types. The extraction process integrates with the automatic determination of displayable information quantity and associated time parameters, which removes subjective decision making in content segmentation that typically requires manual intervention. The automated selection of layouts from predefined templates based on identified display parameters ensures standardised video output while eliminating the need for manual layout decisions per content segment. The template-driven approach, coupled with automatic parameter identification, enables seamless end-to-end video generation that maintains content coherence and timing synchronisation without manual oversight, thereby streamlining the entire video creation process.

The method 400 may provide a more accurate and efficient way for automatically generating the explainer videos from text-based data source 110. The method 400 may further help to improve the efficiency and effectiveness of the content creation and educational industry by creating easy to understand, and educationally entertaining explainer videos. The method 400 may further help to efficiently extract text and images from the text-based data source 110 to generate the explainer videos.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural. The word “exemplary” is used herein to mean “serving as an example, instance or illustration”. Any embodiment described as “exemplary” is not necessarily to be construed as preferred or advantageous over other embodiments and/or to exclude the incorporation of features from other embodiments. The word “optionally” is used herein to mean “is provided in some embodiments and not provided in other embodiments”. It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

I claim:

1. A method for automatically generating explainer videos from a text-based data source, the method comprising:

identifying, by a processor, a plurality of different components of an input document based on a visual analysis of the input document;

determining, by the processor, a reading order of information present in the input document based on the identification of the plurality of different components and the visual analysis of the input document;

executing, by the processor, a structured information extraction comprising extraction of a text-based component and an image-based component based on the identification of the reading order and the identification of the plurality of different components;

identifying, by the processor, an amount of information displayable per screen on a display screen and a time parameter associated with the amount of information displayable per screen, based on content extracted through the structured information extraction;

selecting, by the processor, a first layout from a set of predefined layouts based on the amount of the information identified to be displayable per screen and the time parameter;

generating, by the processor, an explainer video for at least one topic in the input document based on the selected first layout, the amount of information displayable per screen, and the time parameter;

generating a plurality of speech segments per screen based on the identification of the amount of information displayable per screen on the display screen and the time parameter; and generating subtitles in one or more languages for the plurality of speech segments by identifying the plurality of speech segments per screen and the time parameter corresponding to timestamps associated with the plurality of speech segments, wherein the generation of the explainer video for the at least one topic in the input document comprises merging the plurality of speech segments as multi-channel audio and the subtitles in the one or more languages into the explainer video.

2. The method as claimed in claim 1, wherein the different components of the input document comprise page headings, sub-headings, text columns, images, captions, tables, or other predefined components.

3. The method as claimed in claim 1, wherein the method comprises:

detecting a change in a number of columns of text from a first page of the input document to a second page; and updating the reading order per page of the input document when the change in the number of columns of text is detected.

4. The method as claimed in claim 1, wherein the method comprises executing a pre-trained structured information extraction (SIE) model for the structured information extraction in which different types of information including the text-based component and the image-based component are collated per topic present in the input document.

5. The method as claimed in claim 4, wherein the method comprises executing a summarisation model on the content extracted through the structured information extraction to generate summarised content, wherein the amount of information displayable per screen on the display screen is identified using the summarised content.

6. The method as claimed in claim 1, wherein during the structured information extraction, the method comprises:

detecting whether a quality parameter of the image-based component extracted in a given page of the input document is less than a quality threshold;

automatically open the input document on a virtual device to take a screenshot of a relevant section comprising the image-based component when the image-based component is not extractable programmatically or when the quality parameter of the image-based component is less than the quality threshold.

7. A system automatically generating explainer videos from a text-based data source, the system comprising:

a processor configured to:

identify a plurality of different components of an input document based on a visual analysis of the input document;

determine a reading order of information present in the input document based on the identification of the plurality of different components and the visual analysis of the input document;

execute a structured information extraction comprising extraction of a text-based component and an image-based component based on the identification of the reading order and the identification of the plurality of different components;

identify an amount of information displayable per screen on a display screen and a time parameter associated with the amount of information displayable per screen based on content extracted through the structured information extraction;

select a first layout from a set of predefined layouts based on the amount of the information identified to be displayable per screen and the time parameter;

generate an explainer video for at least one topic in the input document based on the selected first layout, the amount of information displayable per screen, and the time parameter;

generate a plurality of speech segments per screen based on the identification of the amount of information displayable per screen on the display screen and the time parameter; and generate subtitles in one or more languages for the plurality of speech segments by identifying the plurality of speech segments per screen and the time parameter corresponding to timestamps associated with the plurality of speech segments, wherein the generation of the explainer video for the at least one topic in the input document comprises merging the plurality of speech segments as multi-channel audio and the subtitles in the one or more languages into the explainer video.

* * * * *